(12) United States Patent
Edelmann et al.

(10) Patent No.: US 10,215,235 B2
(45) Date of Patent: Feb. 26, 2019

(54) BEARING UNIT AND SEPARATOR

(71) Applicant: Aktiebolaget SKF, Gothenburg (SE)

(72) Inventors: Ludwig Edelmann, Sulzthal (DE); Matthias Schuler, Stadtlauringen (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/631,289

(22) Filed: Jun. 23, 2017

(65) Prior Publication Data
US 2017/0370418 A1 Dec. 28, 2017

(30) Foreign Application Priority Data

Jun. 27, 2016 (DE) .......................... 10 2016 211 435

(51) Int. Cl.
*F16C 35/07* (2006.01)
*F16C 19/54* (2006.01)
*F16C 41/04* (2006.01)
*F16C 35/077* (2006.01)
*F16C 33/78* (2006.01)
*F16C 19/36* (2006.01)
*F16C 35/12* (2006.01)

(52) U.S. Cl.
CPC .......... *F16C 35/077* (2013.01); *F16C 19/364* (2013.01); *F16C 19/547* (2013.01); *F16C 33/7813* (2013.01); *F16C 41/04* (2013.01); *F16C 35/12* (2013.01)

(58) Field of Classification Search
CPC .... F16C 19/385; F16C 19/386; F16C 19/388; F16C 19/546; F16C 19/547; F16C 19/548; F16C 35/077; F16C 35/12; F16C 41/04; F16C 33/7813; F16C 19/364
See application file for complete search history.

(56) References Cited

U.S. PATENT DOCUMENTS

| | | | | | |
|---|---|---|---|---|---|
| 2,128,668 | A | * | 8/1938 | Baker ................... | F16C 19/385 384/570 |
| 2,142,958 | A | * | 1/1939 | Slusser ................. | F16C 19/386 384/571 |
| 2,160,420 | A | * | 5/1939 | Scribner ............... | F16C 19/386 384/571 |
| 2,272,757 | A | * | 2/1942 | Tcker .................. | F16C 33/6607 384/466 |
| 2,407,532 | A | * | 9/1946 | Boden .................. | F16C 19/548 384/582 |
| 3,913,992 | A | * | 10/1975 | Scott .................... | F16C 19/386 184/109 |
| 4,235,485 | A | * | 11/1980 | Reiter ................... | B21B 31/07 384/450 |

(Continued)

*Primary Examiner* — Alan B Waits
(74) *Attorney, Agent, or Firm* — Bryan Peckjian; SKF USA Inc. Patent Dept.

(57) ABSTRACT

A bearing unit configured to support a first component for rotary movement with respect to a second component includes a first bearing having an inner ring and an outer ring and a second bearing having an inner ring and an outer ring and a separator axially disposed between and connecting the outer ring of the first bearing and the outer ring of the second bearing in an interference fit manner or in a friction fit manner to form a preassembled unit. The separator may be annular and have a plastic base body with axial openings in which metal spacers, cylindrical rods, for example, are mounted.

13 Claims, 3 Drawing Sheets

(56) References Cited

U.S. PATENT DOCUMENTS

| | | | | | |
|---|---|---|---|---|---|
| 4,336,971 | A | * | 6/1982 | Reiter | B21B 31/07 384/484 |
| 4,798,482 | A | * | 1/1989 | Kruk | F16C 19/385 384/559 |
| 5,159,742 | A | * | 11/1992 | Winter | B21B 31/07 384/581 |
| 5,492,419 | A | * | 2/1996 | Miller | F16C 19/386 384/477 |
| 5,667,313 | A | * | 9/1997 | Kapaan | B60B 27/001 384/504 |
| 5,785,432 | A | * | 7/1998 | Miyazaki | G11B 5/53 384/520 |
| 5,803,616 | A | * | 9/1998 | Persson | F16C 33/6629 384/466 |
| 5,863,136 | A | * | 1/1999 | Miyazaki | F16C 19/54 384/448 |
| 6,000,855 | A | * | 12/1999 | Miyazaki | F16C 35/061 384/517 |
| 2008/0152273 | A1 | * | 6/2008 | Kawaguchi | F16C 19/182 384/455 |
| 2011/0232337 | A1 | * | 9/2011 | Mola | D06F 37/00 68/140 |
| 2015/0247532 | A1 | * | 9/2015 | Suzuki | F16C 33/6674 384/462 |

\* cited by examiner

BEARING UNIT AND SEPARATOR

CROSS-REFERENCE

This application claims priority to German patent application no. 10 2016 211 435.2 filed on Jun. 27, 2016, the contents of which are fully incorporated herein by reference.

TECHNOLOGICAL FIELD

Exemplary embodiments relate to a bearing unit that is configured to support a first component for rotary movement with respect to a second component, as well as a separator for this bearing unit.

BACKGROUND

In a variety of bearing assemblies two bearings are disposed spaced in the axial direction. This can be necessary for different reasons. One application example is, for example, preassembled bearing units.

Here this can be, for example, a conventional bearing unit 1 shown in FIG. 3, for example, a truck hub bearing (truck hub unit or THU). The bearing unit 1 includes a common outer ring 2 that respectively includes on its radially inwardly facing side race surfaces 10 and 11 for a first rolling-element row 3 and a second rolling-element row 4, respectively. A separate inner ring 5 or 6 is respectively associated with the rolling-element rows 3 and 4. Here the outer ring is very long or has a large extension in the axial direction in order to realize an intermediate space in a region 7 between the race surfaces 10 and 11, which can also be referred to as raceways, and also to realize receptacles for seals 8 and 9 of the bearing unit 1. The outer ring 2 is usually manufactured from a rolling-element bearing steel.

Except for on the direct race surfaces 10 and 11, which can also be referred to as race zones, i.e., in regions wherein the rolling elements 3 and 4 roll on the outer ring 2, under certain circumstances no high-strength material is needed. Nonetheless in the manufacturing of the conventional bearing unit 1 a not-insignificant material section, namely in the regions indicated by the reference numbers 7, 8, and 9, must be processed, hardened, and transported. A complexity in the manufacturing of the product and thus also a cost component can thereby increase. This is undesired and can also occur in a variety of other bearing assemblies.

There is therefore a need to simplify the manufacturing of a bearing unit.

SUMMARY

Exemplary embodiments relate to a bearing unit that is configured to support a first component with respect to a second component. For this purpose the bearing unit comprises a first bearing, a second bearing, and a separator, which is disposed in the axial direction between a first outer ring of the first bearing and a second outer ring of the second bearing. The separator is configured to connect the two outer rings to each other as a preassembled unit.

Since the bearing unit comprises two outer rings that are spaced from each other and connected to each other via a separator, in some exemplary embodiments it can be achieved that the two outer rings together have a smaller extension than their comparable one-piece outer ring. Material that is needed and also a weight of the bearing unit can thereby possibly be reduced. In addition, an expense in a processing and/or in a transport of the bearing unit can possibly be reduced.

A preassembled unit, which comprises two outer rings, can, for example, be self-retaining so that the outer rings can be installed as one component. Under certain circumstances not only the outer rings can be present as a preassembled unit, but rather the entire bearing unit can be configured as a preassembled unit, which is installable and/or transportable in a one-part manner, for example, including rolling elements, two inner rings, seals, separators, and/or further components.

Additionally or alternatively the separator can include a different metal than the outer ring. In some exemplary embodiments it can thus be made possible that each component is manufactured from a material that has the best properties for the function of the component.

Additionally or alternatively the separator can be manufactured at least partially or completely from a material that has a lower density than the material of the outer ring. In some exemplary embodiments it can thus be made possible that the bearing unit has a low weight. Under certain circumstances the separator can be manufactured at least partially from a plastic.

Additionally or alternatively the separator can include a base body and at least one spacer. For example, any component that is configured to transmit forces in the axial direction from the first outer ring to the second outer ring can serve as spacer. The base body can be configured to position the at least one spacer in the circumferential direction and/or in the radial direction. In some exemplary embodiments it can thus be made possible that the spacers that support axial loads are correctly positioned.

The base body can have a ring shape. The base body can, for example, include a different material than the outer rings and/or the spacers. For example, the base body can include the material having the lower density, for example, plastic.

Additionally or alternatively the at least one spacer can have an extension in the circumferential direction that is smaller than 180°, 120°, 90°, 45°, 30°, 20°, 15° or 10°. Since the spacer is only intermittently disposed in the circumferential direction, in some exemplary embodiments a weight of the separator can be reduced, and a sufficient stability can nevertheless be achieved. For example, the spacer can be a metallic component in the shape of a sleeve, a pin, a rolling element, for example, ball, roller, needle, cylindrical roller, or the like. The spacer can, for example, have any cross-section shape, for example, round and/or rectangular, square.

In some exemplary embodiments the base body can be configured to support only a part of the axial forces. In other exemplary embodiments, the base body can be configured to transmit no axial forces from the first outer ring to the second outer ring. In a region wherein it is in contact in the axial direction with the two outer rings the spacer can possibly have a slightly larger extension in the axial direction than the spacer. In some exemplary embodiments only the spacer is in a direct material contact with the outer rings. In some exemplary embodiments a deforming or damaging of the base body can thereby possibly be avoided or at least reduced.

Under certain circumstances the separator can include at least two spacers that are spaced from one another in the circumferential direction. Since a plurality of spacers is provided, in some exemplary embodiments it can be achieved that a spacing between the outer rings is as uniform as possible viewed over the circumference. A spacing between two directly adjacent spacers in the circumferential direction can, for example, be larger than an extension of the spacer in the circumferential direction.

Additionally or alternatively the separator can include exactly three spacers. In some exemplary embodiments a geometrically defined spacing can thus be satisfied. The plurality of spacers can be disposed, for example, at the same height or the same diameter in the radial direction.

Additionally or alternatively the base body can include at least one opening disposed eccentric with respect to a center axis, which opening is configured to position the at least one spacer in the circumferential direction and/or in the radial direction. In some exemplary embodiments it can be made possible by the described configuration of the separator that the base body, which, for example, has only a positioning function for the at least one spacer, has a lower weight, and the spacer, which serves to support axial forces and space the outer rings from each other in the axial direction, includes a stable material.

Additionally or alternatively the opening can in addition have a size and/or a shape that corresponds to a size and/or a shape of the spacer. In some exemplary embodiments it can thus be made possible that the spacer can be received in the opening. The opening can be, for example, a through-bore. The opening can, for example, have a circular cross-section. The opening can, for example, be disposed parallel to an axis of rotation of the bearing unit and eccentric thereto. In some exemplary embodiments the at least one opening can also enclose an angle with the axial direction.

The base body can, for example, have an annular basic shape that encloses a main bore. For example, the inner rings can be disposed in the main bore. An outer diameter of the base body can, for example, be at least exactly as large as or larger than an outer diameter of the bearing rings. An inner diameter of the base body can, for example, be larger than an outer diameter of the inner rings of the bearing unit and/or smaller than an inner diameter of the outer rings. The inner diameter of the base body can also possibly be larger than an inner diameter of the outer rings.

Additionally or alternatively the separator or the base body can at least sectionally project radially inward. In some exemplary embodiments the separator can thus form grease pockets in order to prevent grease from the bearings from reaching into an intermediate space axially between the bearings. For example, a radial extension of the ring or of its cross section can correspond to at least a maximum radial extension that arises between an inner race surface and an outer diameter of the outer ring. Under certain circumstances the base body or its radially-inward-reaching areas that form the grease pockets can be configured such that these areas project near to the inner rings; however these areas do not contact the inner rings in operation but rather form a minimum gap. The gap can be, for example, at most 0.1 mm, 0.2 mm, or 0.5 mm.

Additionally or alternatively the first outer ring and the second outer ring can be spaced from each other in the axial direction by at least three spacers manufactured from a metallic material, wherein the spacers are spaced from one another in the circumferential direction and are each received in an opening of the base body. In some exemplary embodiments a central region of a long common outer ring can thus be replaced.

Additionally or alternatively the bearing unit can also comprise at least one seal receptacle, which is configured to retain a seal in the axial direction outside the race surface. The seal receptacle can, for example, be manufactured from a plastic. In some exemplary embodiments it can thereby be made possible that steel parts are replaced by plastic. Under certain circumstances a weight reduction can thus be made possible. For example, the seal receptacle can be disposed on an outwardly lying side in the axial direction of a first bearing outer ring and/or of a second bearing outer ring. Additionally or alternatively, instead of the seal receptacle or in addition at least one plastic cap can be disposed that in fact carries no seal but at least sectionally closes off the bearing in the axial direction. In some exemplary embodiments it can thereby be made possible that an outwardly lying section in the axial direction of the outer ring is manufactured from a plastic. The plastic cap and/or the seal receptacle can possibly have an extension in the axial direction that corresponds to a length by which an inner ring axially outwardly overlaps in an installed state of the outer ring or is longer than this.

Exemplary embodiments also relate to a separator that is configured to space two outer rings of a bearing unit from each other in the axial direction and connect them to each other. For this purpose the separator comprises a base body made from a plastic, wherein the base body includes at least two openings spaced from each other in the circumferential direction, disposed eccentric with respect to a rotational axis. The openings are configured to receive a spacer that is manufactured from a metallic material. In some exemplary embodiments it can thus be made possible that two outer rings can be connected into one outer ring. In comparison to conventional bearing embodiments wherein split outer rings are indeed used but they abut on each other in the axial direction, a weight can possibly be reduced, a transport and/or a manufacturing simplified.

The exemplary embodiments and their individual features disclosed in the above description, the following claims, and the accompanying Figures can be meaningful and implemented both individually and in any combination for the realization of an exemplary embodiment in its various designs.

DETAILED DESCRIPTION

In the following description of the accompanying depictions, identical reference numbers designate identical or comparable components. Furthermore, summarizing reference numbers are used for components and objects that appear multiple times in an exemplary embodiment or in an illustration, but that are described together in terms of one or more common features. Components or objects that are described with identical or summarizing reference numbers can be identical with respect to individual, multiple, or all features, for example their dimensions, but possibly also embodied differently provided the description does not explicitly or implicitly indicate otherwise.

Figure 1:
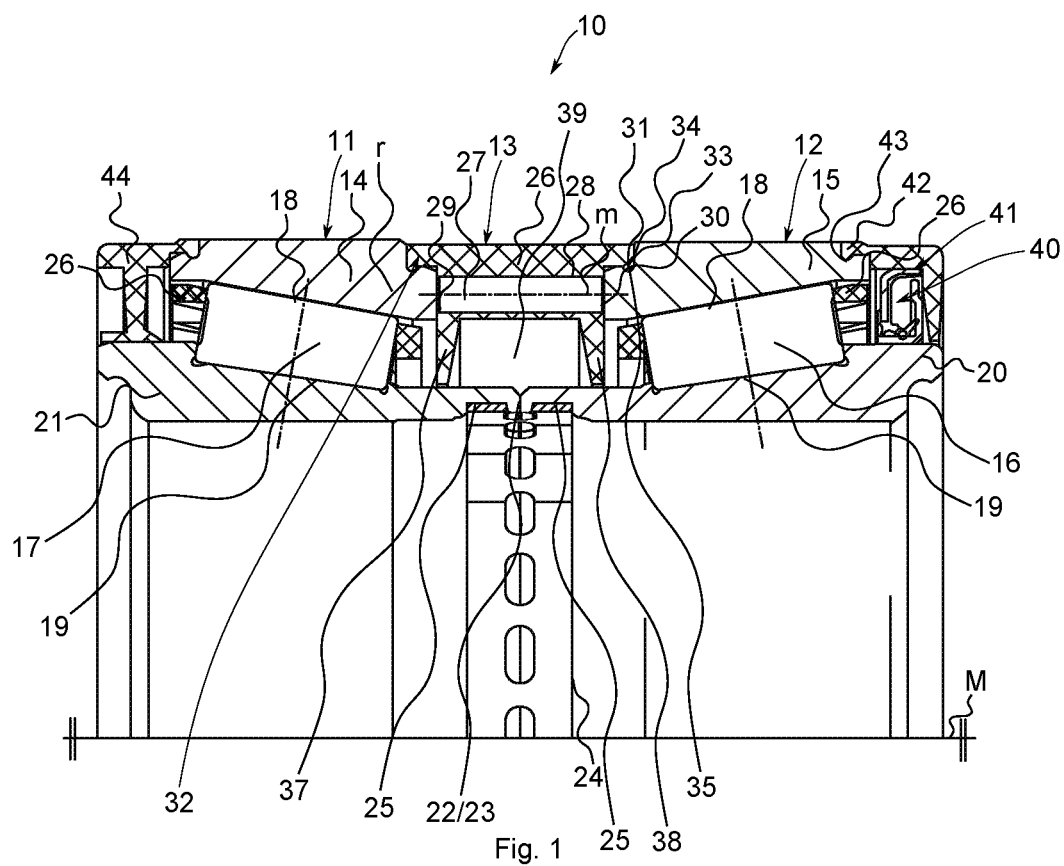
FIG. 1 is a schematic depiction of a sectional view of a bearing assembly including a separator according to an exemplary embodiment.
Figure 2:
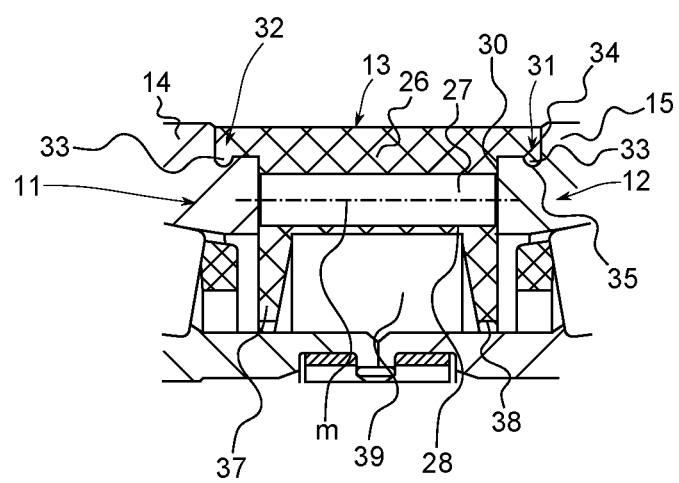
FIG. 2 is a schematic depiction of an enlarged section of FIG. 1.
Figure 3:
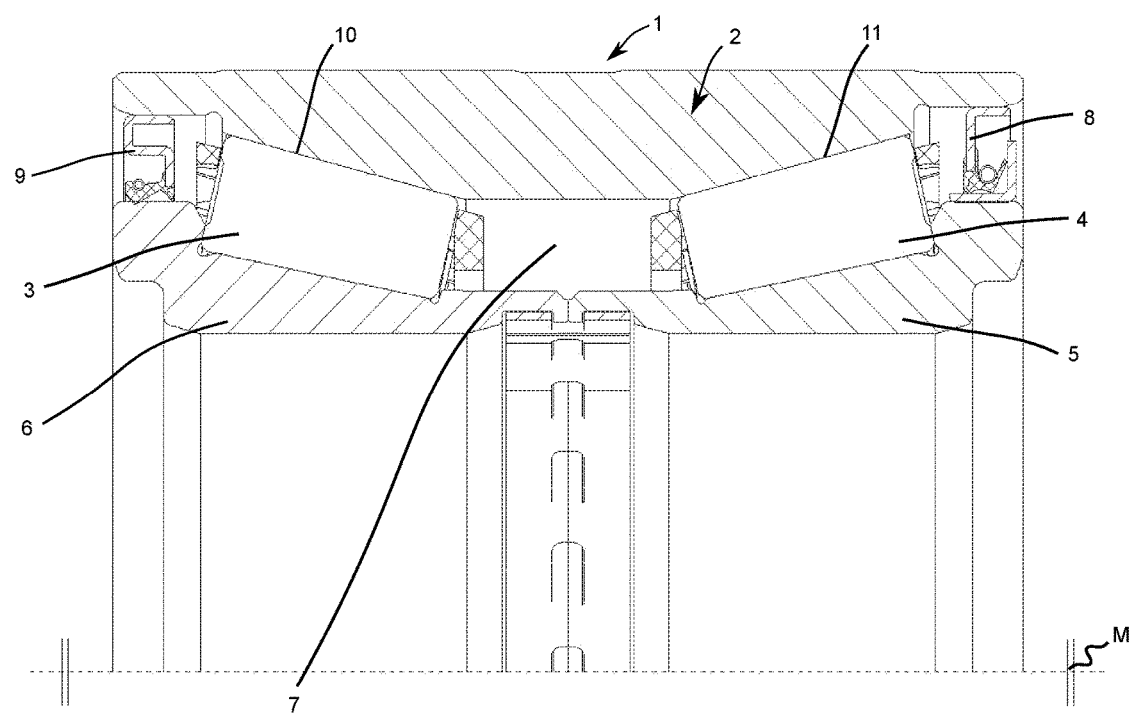
FIG. 3 is a schematic depiction of a sectional view of a conventional bearing assembly.

FIGS. 1 and 2 shows a schematic sectional depiction of a bearing unit 10. The bearing unit 10 comprises a first bearing 11 as well as a second bearing 12 and a separator 13. The separator 13 is disposed in axial direction (the direction of axis M) between a first outer ring 14 of the first bearing 11 and a second outer ring 15 of the second bearing 12. The separator 13 is configured to connect the two outer rings 14 and 15 to each other as a preassembled unit. Of course the separator 13 is also configured to hold the two outer rings 14 and 15 at a defined axial distance to each other in the axial direction. In some exemplary embodiments this distance be set with a precision of between 5 μm and 20 μm.

In the exemplary embodiment of FIGS. 1 and 2 the bearings 11 and 12 are each a tapered roller bearing that are installed in a back-to-back arrangement with respect to each other, i.e., such that their rolling elements 16 and 17 are facing one another with their smaller diameters. Each of the outer rings 14 and 15 respectively includes a race surface 18 for the rolling elements 16 and 17 on a radially inwardly facing side. An inner race surface of the bearing 14 and of the bearing 15 is located respectively on an inner ring 20 of the second bearing 12 and an inner ring 21 of the first bearing 11. The two inner rings 21 and 20 abut on each other in the axial direction on their inwardly directed end surfaces 22 and 23. Radially inwardly the two inner rings 20 and 21 are connected to each other in the region of their end surfaces 22 and 23 via a connecting ring 24. The inner rings 20 and 21 include recesses 25 on their radially inwardly directed sides that serve for the receiving of the connecting ring 24.

The rolling elements 17 and 16 are respectively retained in a rolling-element bearing cage 26. In some further, not-depicted exemplary embodiments the bearing can have a different shape and/or arrangement. For example, the rolling elements can be omitted. It can be an X-arrangement or bearings with different rolling elements, for example, ball roller bearings, cylindrical roller bearings, needle roller bearings, or the like.

The separator 13 comprises a base body 26 as well as at least one spacer 27. In the exemplary embodiment of the Figures the separator 13 comprises three spacers that are disposed spaced from each other in the circumferential direction. Directly adjacent spacers each have a spacing of 120° to one another. In FIG. 1 only one of the spacers 27 can be seen. The spacer 27 and also the not-depicted spacers serve to space the two outer rings 14 and 15 from each other in the axial direction M. The spacer 27 includes a harder and more stable material than the base body 26, for example, the same material as the outer rings 14 and 15 or a different metallic material, for example, steel.

The base body 26 includes a lighter material, for example, a plastic or a ceramic. The base body 26 is configured as an annular component that includes at least one opening 28 in which the spacer 27 can be disposed. The base body 26 also includes two further, not-depicted openings for the two not-depicted spacers.

Via the opening 28 the spacer 27 is positioned radially inward and radially outward as well as in the circumferential direction. The spacer 27 can, for example, be configured as a needle roller or cylindrical roller, but does not serve as a rotating rolling element. In other words the spacer 27 does not perform any rotational movement about its own center axis m. The opening 28 has a shape and size that is configured such that the spacer 27 is received therein. Just like the spacer 27, the opening 28 has a circular cross-section. The spacer 27 and the opening 28 are related in size such that the spacer 27 can be easily pushed into the opening 28 but cannot fall out by itself. In other exemplary embodiments the openings and the spacers can also have other fits or no fit with respect to each other. In some further, not-depicted exemplary embodiments the spacers can also have a different shape, for example, an angular cross-section, and/or be provided in a different number.

The axis m of the opening 28 is disposed parallel to the center axis M of the bearing unit and radially outside it. In the installed state the opening 28 is located at a radial height at which the inwardly facing end sides 29 and 30 of the outer rings 15 and 14 are also located. A diameter of the opening 28 here is at least 10%, 20%, 25%, 30%, 40%, 50%, 60%, 70% of a maximum radial extension r of the outer rings 14 or 15. However, the diameter of the opening 28 or of the spacer 27 here can be less than 80%, 70%, 60%, 50% of the maximum radial extension r of the outer rings 14 and 15.

In a region radially outside the bore 28 the separator includes a connecting structure 31 and 32 on both sides. This can be seen better in the enlarged depiction of FIG. 2. The connecting structures 31 and 32 extend here farther in the axial direction than a region of the base body 26 wherein the bore or opening 28 is disposed. At the end of the axial region a lug 33 is formed that points in the radial direction. Both sides are symmetrically configured, therefore only the side of the outer ring 15 is representatively described.

Viewed from its end side 30, the outer ring 15 has a smaller diameter on its radially outwardly directed surface than in a region of the outer ring 15 that connects to a shoulder 34. Viewed from the shoulder 34, a groove 35 is disposed on a side facing the end side 30. The groove 35 is disposed encircling in the circumferential direction. The lug 33 engages into this groove 35. The groove 35 and the lug 33 are configured here such that they abut on each other in an interference-fit manner. The outer ring 15 thus includes a receiving structure (e.g., the groove 35), which is configured, together with the connecting structure 31 of the separator 13, to connect the outer ring 15 to the separator 13. The outer ring 14 also has such a not-further-specified receiving structure. In some further, not-depicted exemplary embodiments the connecting structure can also have a different shape or function, for example, the groove and the lug can be in contact with each other in a friction-fit manner.

Radially inside the opening 28 the separator 13 includes radially inwardly projecting sections 37 and 38. The sections 37 and 38 are spaced from each other in the axial direction. The sections 37 and 38 have a relatively thin extension in the axial direction, almost only web- or leaf-shaped. The sections 37 and 38 project radially inwardly almost up to the inner rings 20 and 21, but they are spaced by a gap by at least 0.01 mm, 0.05 mm, 0.1 mm, 0.5 mm, or 1 mm. The sections 37 and 38 serve to actually retain grease from the bearings 11 and 12 in them and to prevent, or at least reduce, a risk that the grease flows into an intermediate space 39 that is located between the bearings 11 and 12 in the axial direction. The separator 13 can be referred to, for example, as a distance ring.

The bearing 12 is closed axially outward via a seal 40. The seal 40 is retained in a seal receptacle 41. The seal receptacle 41 also includes a connecting structure 42 that engages into a corresponding groove 43 of the outer ring 15. The seal receptacle 41 can be manufactured, for example, from a plastic. In some further, not-depicted exemplary embodiments the seals can be omitted, have another shape, and/or the seal receptacles can be omitted.

In an analogous manner a cover disc 44 made from a plastic is provided on the other bearing 11. This terminates the bearing 11. In some further, not-depicted exemplary embodiments, instead of the cover disc 44 a similar arrangement of the seal receptacle 41 and the seal 40 can be provided.

In the exemplary embodiment of the figures the bearing unit 10 is a truck hub unit (truck hub unit, THU) including an outer ring in a component structure. The bearing assembly has a diameter that falls in a range between 70 mm and 90 mm. Under certain circumstances the bearing can also have a diameter that is greater than 50 mm and smaller than 150 or 250 mm. The outer ring can be composed of various components. The steel parts in the rolling element region, i.e., those that form the race surfaces, can be connected to one another or held at a spacing by plastic parts, namely the separator. Here an inner plastic ring, i.e., the base body, is embodied such that it can retain standard parts, such as, for example, balls, rollers, needles, in position axially between the two outer-ring shoulders and thus as spacer can generate a precise spacing.

Via lateral end caps the cover disc 44 or the seal receptacle 41, for example, can be clipped into the outer rings and serve as gap seal and/or receive additional seals. In some exemplary embodiments a manufacturing complexity can be reduced by the bearing assemblies or the outer ring. Cost advantages can thereby arise. Furthermore, a significant weight saving compared to conventional bearings can possibly be achieved.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing units with separators.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing unit
2 Outer ring
3 Rolling-element row
4 Rolling-element row
5 Inner ring
6 Inner ring
7 Region
8 Seal
9 Seal
10 Bearing unit
11 Bearing
12 Bearing
13 Separator
14 Outer ring
15 Outer ring
16 Rolling element
17 Rolling element
18 Race surface
19 Inner race surface
20 Inner ring
21 Inner ring
22 End surface
23 End surface
24 Connecting ring
25 Recess
26 Base body
27 Spacer
28 Opening
29 End side
30 End side
31 Connecting structure
32 Connecting structure
33 Lug
34 Shoulder
35 Groove
37 Section
38 Section
39 Intermediate space
40 Seal
41 Seal receptacle
42 Connecting structure
43 Groove
44 Cover disc
M Axial direction
r Radial extension

What is claimed is:

1. A bearing unit configured to support a first component for rotary movement with respect to a second component, the bearing unit comprising:
a first bearing having an inner ring and an outer ring, the outer ring of the first bearing having a first axial end formed by a first radially extending axial surface;
a second bearing having an inner ring and an outer ring, the outer ring of the second bearing having a second axial end formed by a second radially extending axial surface, the second axial end facing the first axial end; and
a separator axially disposed between and connecting the outer ring of the first bearing and the outer ring of the second bearing in an interference fit manner or in a friction fit manner to form a preassembled unit, the separator comprising a central hole and at least two openings radially spaced from the central hole and extending from a first annular surface to a second annular surface and a metal spacer in each of the at least two openings, each of the at least two openings having first and second opening ends that are radially overlapped by the first axial end of the outer ring of the first bearing and by the second axial end of the outer ring of the second bearing, radially extending axial surfaces of each of the at least two spacers being in contact with the first axial end of the outer ring of the first bearing and the second axial end of the outer ring of the second bearing.

2. The bearing unit according to claim 1, wherein the separator connects the outer ring of the first bearing and the outer ring of the second bearing in an interference fit manner.

3. The bearing unit according to claim 2, wherein the separator comprises a base body made from a plastic.

4. The bearing unit according to claim 3, wherein at least one of the spacers has an extension in a circumferential direction that is less than 20°.

5. The bearing unit according to claim 3, wherein at least one of the spacers is cylindrical.

6. The bearing unit according to claim 3, wherein the base body is configured to position the spacers in a circumferential direction and in a radial direction.

7. The bearing unit according to claim 3, wherein the metal spacers are spaced from each another in the circumferential direction.

8. The bearing unit according to claim 3, wherein the base body comprises a ring having a first axial side in contact with the outer ring of the first bearing and a second axial side in contact with the outer ring of the second bearing.

9. The bearing unit according to claim 8, further comprising at least one plastic seal receptacle configured to secure a seal outside a race surface in the axial direction.

10. The bearing unit according to claim 3, wherein the separator includes first and second radially inwardly projecting webs configured to prevent grease from the bearings from entering into an intermediate space axially between the bearings.

11. The bearing unit according to claim 10, wherein the first web projects toward the inner ring of the first bearing and is spaced from the inner ring of the first bearing by a first gap, wherein the second web projects toward the inner ring of the second bearing and is spaced from the inner ring of the second bearing by a second gap, and wherein a size of the first and second gaps is selected to interfere with movement of grease from the first bearing and from the second bearing to the intermediate space.

12. A bearing unit configured to support a first component for rotary movement with respect to a second component, the bearing unit comprising:
   a first bearing having an inner ring and an outer ring, the outer ring of the first bearing having a first axial side and having a radially outwardly facing annular groove;
   a second bearing having an inner ring and an outer ring, the outer ring of the second bearing having a first axial side configured to face the first axial side of the first bearing in the bearing unit and the outer ring of the second bearing having a radially outwardly facing annular groove; and
   a plastic annular separator having a first projection extending into the annular groove of the outer ring of the first bearing and a second projection extending into the annular groove of the outer ring of the second bearing and connecting the first bearing to the second bearing in an interference fit manner, the separator having a first annular surface facing the first axial side of the outer ring of the first bearing and a second annular surface facing the first axial side of the outer ring of the second bearing and a central hole and at least two openings radially spaced from the central hole and extending from the first annular surface to the second annular surface and a metal spacer in each of the at least two openings, each of the at least two spacers being in contact with the outer ring of the first bearing and the outer ring of the second bearing.

13. The bearing unit according to claim 12, wherein the metal spacers are cylindrical.

* * * * *